United States Patent
Mohammadbaghery et al.

(10) Patent No.: US 11,640,006 B2
(45) Date of Patent: May 2, 2023

(54) DETECTING POSITION OF IONIZING RADIATION

(71) Applicants: Faiyaz Mohammadbaghery, Tehran (IR); Shahyar Saramad, Tehran (IR); Mojtaba Shamsaiezafarghandi, Tehran (IR)

(72) Inventors: Faiyaz Mohammadbaghery, Tehran (IR); Shahyar Saramad, Tehran (IR); Mojtaba Shamsaiezafarghandi, Tehran (IR)

(73) Assignees: AMIRKABIR UNIVERSITY OF TECHNOLOGY, Tehran (IR); Faiyaz Mohammadbaghery, Tehran (IR); Shahyar Saramad, Tehran (IR); Mojtaba Shamsaei, Tehran (IR)

( * ) Notice: Subject to any disclaimer, the term of this patent is extended or adjusted under 35 U.S.C. 154(b) by 68 days.

(21) Appl. No.: 17/402,531

(22) Filed: Aug. 14, 2021

(65) Prior Publication Data
US 2021/0373185 A1 Dec. 2, 2021

Related U.S. Application Data

(60) Provisional application No. 63/066,236, filed on Aug. 16, 2020.

(51) Int. Cl.
| | | |
|---|---|---|
| G01T 1/29 | (2006.01) | |
| G01T 1/15 | (2006.01) | |
| H01J 47/00 | (2006.01) | |
| H01J 47/02 | (2006.01) | |
| H01B 7/08 | (2006.01) | |

(52) U.S. Cl.
CPC .............. *G01T 1/29* (2013.01); *G01T 1/15* (2013.01); *H01J 47/001* (2013.01); *H01J 47/02* (2013.01); *H01B 7/08* (2013.01)

(58) Field of Classification Search
CPC .. G01T 1/29; G01T 1/15; H01J 47/001; H01J 47/02; H01B 7/08
See application file for complete search history.

(56) References Cited

U.S. PATENT DOCUMENTS 6,362,484 B1 * 3/2002 Beyne .................. G01T 1/2935
250/374

\* cited by examiner

*Primary Examiner* — David P Porta
*Assistant Examiner* — Fani Polyzos Boosalis
(74) *Attorney, Agent, or Firm* — Bajwa IP Law Firm; Haris Zaheer Bajwa

(57) ABSTRACT

A system for detecting a position of an ionizing radiation. The system includes a radiation detector including a plurality of cathode films, a plurality of anode strips sets, a plurality of insulator films, a conductive grid, and a drift region. Each set of the plurality of anode strips sets is disposed between a respective pair of adjacent cathode films of the plurality of cathode films. Each of the plurality of insulator films is disposed between a respective cathode film of the plurality of cathode films and a respective set of the plurality of anode strips sets. The conductive grid is disposed in parallel with the detection plane and exposed to the ionizing radiation. A drift region includes a region between the conductive grid and the detection plane. The radiation detector is configured to ionize a gas by generating an electric field inside the drift region.

20 Claims, 12 Drawing Sheets

DETECTING POSITION OF IONIZING RADIATION

CROSS-REFERENCE TO RELATED APPLICATION

This application claims the benefit of priority from pending U.S. Provisional Patent Application Ser. No. 63/066,236, filed on Aug. 16, 2020, and entitled "TWO-DIMENSIONAL MICRO-EDGE GAS CHAMBER," which is incorporated herein by reference in its entirety.

TECHNICAL FIELD

The present disclosure generally relates to radiation detectors, and particularly, to gaseous ionizing radiation detectors.

BACKGROUND

Various applications in high energy physics, astronomy, medical imaging, accelerators, and plasma physics need to detect charged (electron or ion) or neutral (photon or neutron) particles. Radiation gaseous detectors are one of extensively used detection instruments used to extract energy, position, and timing information of particles. In radiation gaseous detectors, induced electrical signals are formed by collecting electric charges generated by ionizing particles in a gas. However, electrical signals generated in ionization gaseous detectors are usually weak, decreasing a precision of detection. Therefore, to extract radiation information correctly, increasing a number of collected charges may be necessary. A number of collected charges may be increased by electron multiplication. In a process called secondary emission, when a single electron in an ionizing gas is accelerated by an electric field with a high enough intensity, extra electrons may be emitted. Therefore, by applying an electric potential between an anode and a cathode of a radiation gaseous detector, a high intensity electric field may be formed in a small multiplication region near the anode. Hence, primary generated electrons in a gaseous detector may accelerate in a high intensity electric field, generating secondary electrons and ions. A multiplication of secondary electrons may be repeated in a small multiplication region, resulting in a large number of electrons that are collected at an anode and ions that are collected at a cathode.

Micro-strip gas chamber (MSGC) is a conventional radiation gaseous detector. An MSGC consists of an alternating thin structure of anode and cathode strips on an insulator substrate that may be fabricated with high accuracy photolithographic techniques developed for semiconductor technology. Imperfections in photolithography process and also large deposition energies inside gases may result in electric discharges that may damage thin metal anode and cathode electrodes. Another drawback of MSGCs is accumulation of charges on a surface of insulator substrate. Accumulated charges may impact an electric field near an anode electrode that may reduce an electron multiplication of MSGC at high rates of ionizing radiation.

Anode and cathode strips require a good adhesion to insulator substrate to decrease a probability of releasing metal fragments into gas. Anode and cathode strips also require a high melting point to have a higher resistance to damage. As a result, there are some limitations in choosing a suitable material for anode and cathode strips, resulting in high cost and challenging fabrication process.

MSGCs with vertical and horizontal anode and cathode strips may be utilized for two-dimensional (2D) radiation positioning. However, 2D positioning may be possible only by synchronization of signals in respective horizontal and vertical strips. Therefore, a 2D MSGC requires synchronization electronics, increasing fabrication complexity and cost of MSGCs. In addition, 2D MSGCs may not be suitable for detecting high fluence of ionizing radiations.

There is, therefore, a need for an ionizing radiation detector fabricated without photolithography and synchronization electronics, robust to electric discharges, usable at high rates of ionizing radiation, and mechanically stabilized. There is also a need for an ionizing radiation detector with capability of 2D positioning of ionizing radiations.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary system for detecting a position of an ionizing radiation. An exemplary system may include a radiation detector, a charge-sensitive preamplifier, and a pulse height analyzer. An exemplary radiation detector may include a plurality of cathode films, a plurality of anode strips sets, a plurality of insulator films, a conductive grid, and a drift region. In an exemplary embodiment, a top edge of each of the plurality of cathode films may be disposed on a detection plane. In an exemplary embodiment, respective anode strips in each respective anode strips set of the plurality of anode strips sets may be equally spaced apart on a respective anode plane of a plurality of anode planes. In an exemplary embodiment, each respective anode strips set of the plurality of anode strips sets may be disposed between a respective pair of adjacent cathode films of the plurality of cathode films. In an exemplary embodiment, a top edge of each of the plurality of anode strips sets may be disposed on the detection plane. In an exemplary embodiment, each of the plurality of insulator films may be disposed between a respective cathode film of the plurality of cathode films and a respective anode strips set of the plurality of anode strips sets. In an exemplary embodiment, each of the plurality of insulator films may be in contact with a respective cathode film of the plurality of cathode films and a respective anode strips set of the plurality of anode strips sets. In an exemplary embodiment, a top edge of each of the plurality of insulator films may be disposed on the detection plane. In an exemplary embodiment, the conductive grid may be disposed in parallel with the detection plane and exposed to the ionizing radiation. An exemplary drift region may include a region between the conductive grid and the detection plane. An exemplary drift region may be filled with a gas. An exemplary radiation detector may be configured to ionize the gas. An exemplary gas may be ionized by generating an electric field inside the drift region. An exemplary electric field may be generated responsive to application of a first electric potential on each of the plurality of cathode films, application of a second electric potential larger than the first electric potential on each anode strip of the plurality of anode strips sets, and application of a third electric potential smaller than the first electric potential on the conductive grid. An exemplary charge-sensitive preamplifier may be configured to extract a plurality of electric pulses from the plurality of anode strips sets. In an exemplary embodiment, the pulse height analyzer may be configured to obtain a position of the ionizing radiation based on the plurality of electric pulses.

An exemplary radiation detector may further include a pair of plexiglass sheets. In an exemplary embodiment, the pair of plexiglass sheets may be configured to fix a respective distance between each respective cathode film of the plurality of cathode films and each respective anode plane of the plurality of anode planes.

An exemplary system may further include a direct current (DC) high voltage source. An exemplary DC high voltage source may be configured to apply the first electric potential on each of the plurality of cathode films, apply the second electric potential on each anode strip of the plurality of anode strips sets, and apply the third electric potential on the conductive grid.

In an exemplary embodiment, each of the plurality of insulator films may include a respective substrate of a respective ribbon cable of a plurality of ribbon cables. In an exemplary embodiment, each of the plurality of anode strips sets may include a respective conductive wires set of a plurality of conductive wires sets. In an exemplary embodiment, each of the plurality of conductive wires sets may be attached to a respective substrate of a respective ribbon cable of the plurality of ribbon cables.

An exemplary system may further include a plurality of connector boards. In an exemplary embodiment, the plurality of connector boards may be configured to connect the plurality of ribbon cables to the charge-sensitive preamplifier. In an exemplary embodiment, each of the plurality of connector boards may include a plurality of conductive pads, a plurality of resistors, and a plexiglass sheet. In an exemplary embodiment, each of the plurality of conductive pads may be configured to be in contact with a respective conductive wire in a respective conductive wires set of the plurality of conductive wires sets. In an exemplary embodiment, the plurality of conductive pads may be connected to the charge-sensitive preamplifier. In an exemplary embodiment, each of the plurality of resistors may be configured to connect an output of the DC high voltage source to a respective conducting wire in a respective conductive wires set of the plurality of conductive wires sets. An exemplary plexiglass sheet may be configured to fix a contact of each respective conductive wire in a respective conductive wires set of the plurality of conductive wires sets to a respective conductive pad of the plurality of conductive pads.

In an exemplary embodiment, a vertical distance of each adjacent pair of anode strips in each anode strips set of the plurality of anode strips sets may be equal to $\sqrt{12} R_v$ where $R_v$ is a vertical resolution of the radiation detector. In an exemplary embodiment, a horizontal distance of each adjacent pair of anode strips sets of the plurality of anode strips sets may be equal to $\sqrt{12} R_h$ where $R_h$ is a horizontal resolution of the radiation detector.

An exemplary radiation detector may further include a conductive chamber. An exemplary conductive chamber may be configured to confine the gas inside the drift region. In an exemplary embodiment, the conductive chamber may include an inlet and an outlet. An exemplary inlet may be configured to pass the gas through the conductive chamber. An exemplary outlet may be configured to exhaust an air inside the conductive chamber from the conductive chamber. In an exemplary embodiment, the gas may include a mixture of 70% argon and 30% carbon dioxide.

In an exemplary embodiment, each of the plurality of cathode films may include a respective copper film. In an exemplary embodiment, each anode strip of the plurality of anode strips sets may include a respective aluminum strip. In an exemplary embodiment, each of the plurality of insulator films may include a respective Mylar film.

Other exemplary systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the claims herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1A:
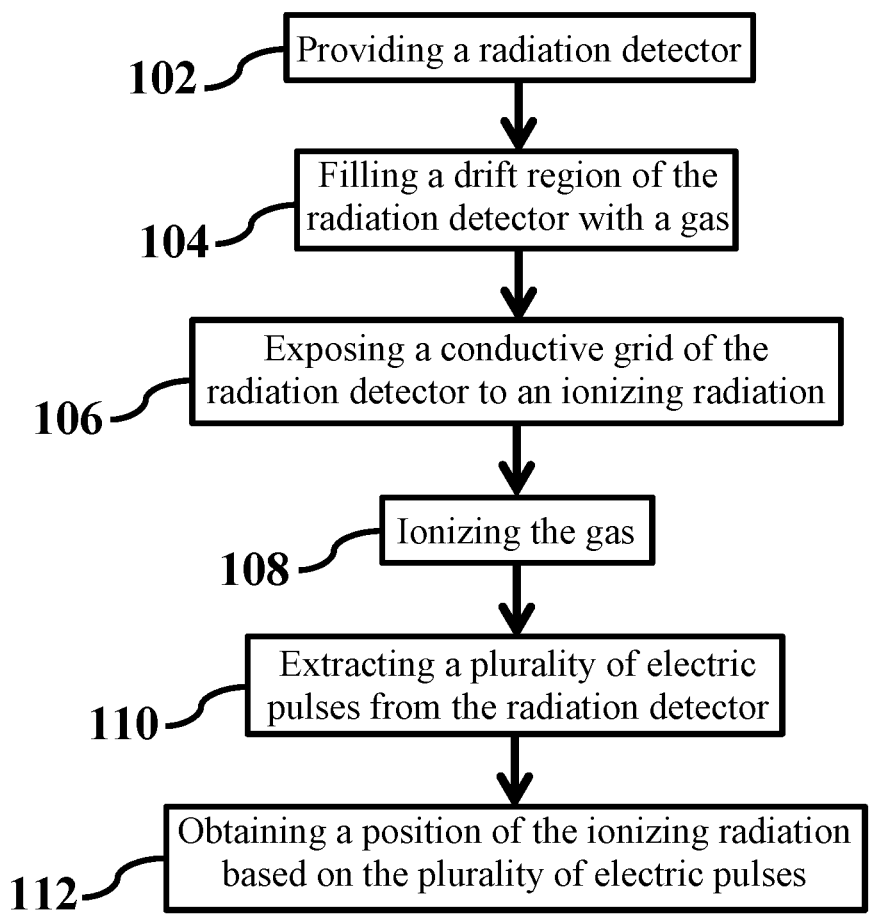
FIG. 1A shows a flowchart of a method for detecting a position of an ionizing radiation, consistent with one or more exemplary embodiments of the present disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein is disclosed an exemplary ionizing radiation detector for detecting and positioning an ionizing radiation. An exemplary ionizing radiation detector may include a cascade structure of anode strips and cathode films separated with insulator films. Top edges of anode strips, cathode films, and insulator films may be placed on a detection plane. As a result, top edges of anode strips may be distributed on an exemplary detection plane and each anode strip may represent a pixel of an exemplary ionizing radiation detector. An exemplary ionizing radiation detector may also include an exemplary conductor grid placed in parallel with an exemplary detection plane, defining a drift space between the conductive grid and the detection plane.

An exemplary electric field may be formed in an exemplary drift region by applying respective electric potentials to anode strips, cathode films, and a conductive grid. An exemplary electric field may separate electrons and ions of a gas in a drift region, resulting in electron emissions. Exemplary emitted electrons may be forced toward anode strips and after multiplication near anode strips, electrons may be collected by anode strips, resulting in electric pulses. Electric pulses may then be amplified by a charge-sensitive preamplifier and fed to a pulse height analyzer. An exemplary pulse height analyzer may analyze heights and number of electric pulses of each anode strip to find a position of an ionizing radiation. An exemplary ionizing radiation may be located in a specific pixel by considering a number of electric pulses obtained from an exemplary anode strip in the specific pixel, when heights of electric pulses are larger than a threshold.

FIG. 1A shows a flowchart of a method for detecting a position of an ionizing radiation, consistent with one or more exemplary embodiments of the present disclosure. In an exemplary embodiment, a method 100 may include providing a radiation detector (step 102), filling a drift region of the radiation detector with a gas (step 104), exposing a conductive grid of the radiation detector to an ionizing radiation (step 106), ionizing the gas (step 108), extracting a plurality of electric pulses from the radiation detector (step 110), and obtaining a position of the ionizing radiation based on the plurality of electric pulses (step 112).

Figure 2A:
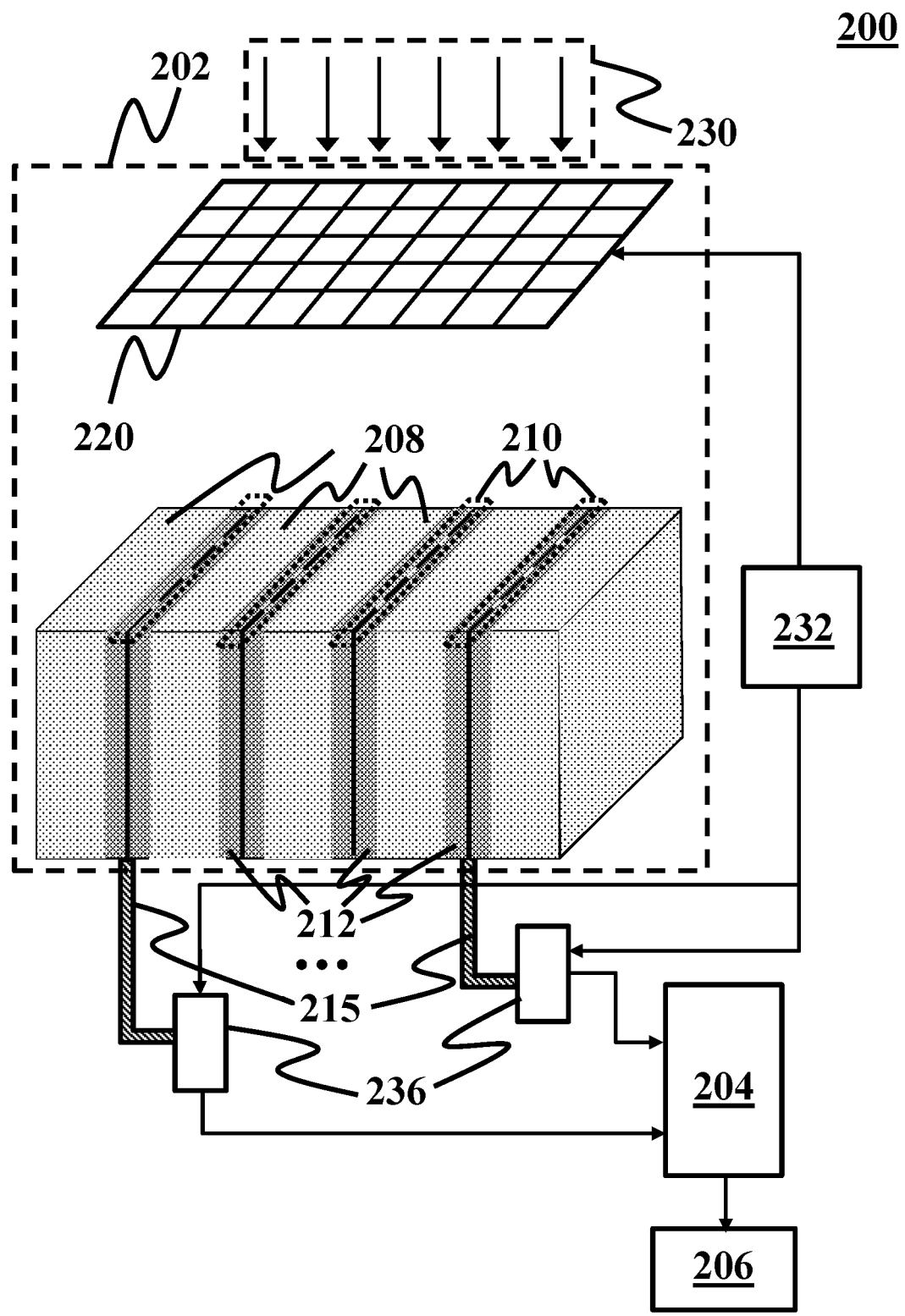
FIG. 2A shows a schematic of a system for detecting a position of an ionizing radiation, consistent with one or more exemplary embodiments of the present disclosure.

FIG. 2A shows a schematic of a system for detecting a position of an ionizing radiation, consistent with one or more exemplary embodiments of the present disclosure. In an exemplary embodiment, a system 200 may include a radiation detector 202, a charge-sensitive preamplifier 204, and a pulse height analyzer 206. In an exemplary embodiment, different steps of method 100 may be implemented utilizing system 200.

Figure 1B:
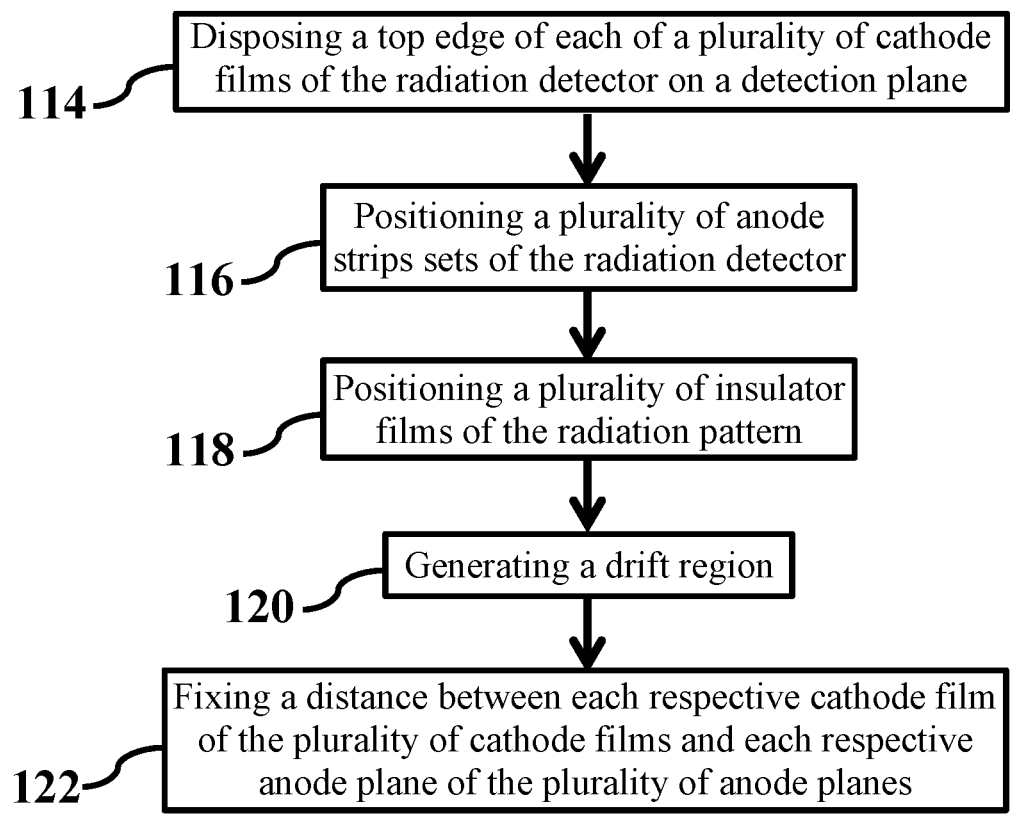
FIG. 1B shows a flowchart of a method for providing a radiation detector, consistent with one or more exemplary embodiments of the present disclosure.

In further detail with respect to step 102, FIG. 1B shows a flowchart of a method for providing a radiation detector, consistent with one or more exemplary embodiments of the present disclosure. In an exemplary embodiment, providing radiation detector 202 may include disposing a top edge of each of a plurality of cathode films of radiation detector 202 on a detection plane (step 114), positioning a plurality of anode strips sets of radiation detector 202 (step 116), positioning a plurality of insulator films of radiation pattern 202 (step 118), and generating a drift region (step 120).

Figure 2B:
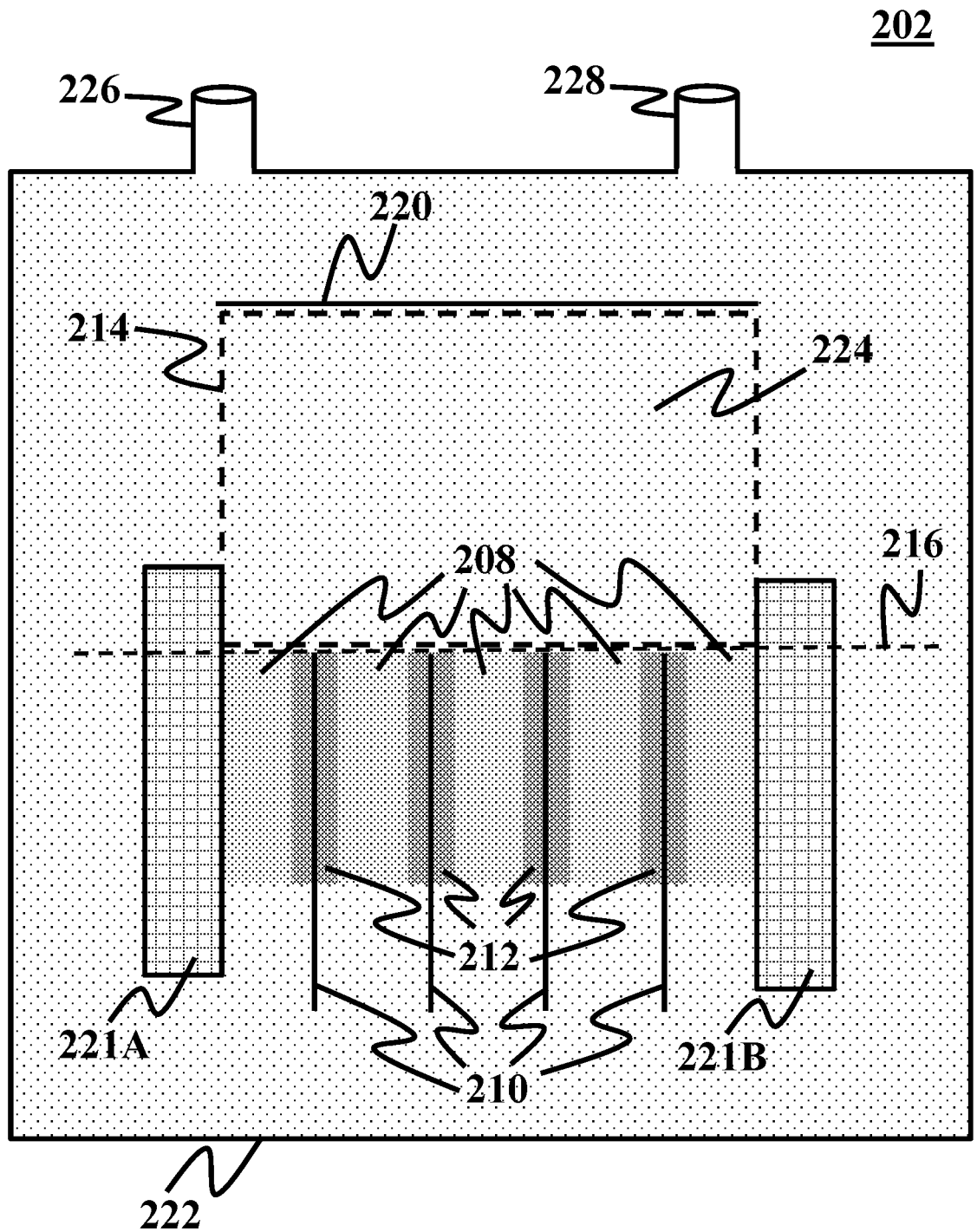
FIG. 2B shows a schematic of a side-view of a radiation detector, consistent with one or more exemplary embodiments of the present disclosure.

FIG. 2B shows a schematic of a side-view of a radiation detector, consistent with one or more exemplary embodiments of the present disclosure. In an exemplary embodiment, radiation detector 202 may include a plurality of cathode films 208, a plurality of anode strips sets 210, a plurality of insulator films 212, and a drift region 214.

For further detail with regard to step 114, in an exemplary embodiment, a top edge of each of plurality of cathode films 208 may be disposed on a detection plane 216. In an exemplary embodiment, detection plane 216 may include a surface of plurality of cathode films 208, plurality of anode strips sets 210, and plurality of insulator films 212 that may be utilized for radiation detection. In an exemplary embodiment, plurality of cathode films 208, plurality of anode strips sets 210, and plurality of insulator films 212 may be disposed similarly on detection plane 216. Detail of disposing plurality of cathode films 208, plurality of anode strips sets 210, and plurality of insulator films 212 is provided below under step 118. In an exemplary embodiment, each of plurality of cathode films 208 may include a respective copper film.

Figure 2C:
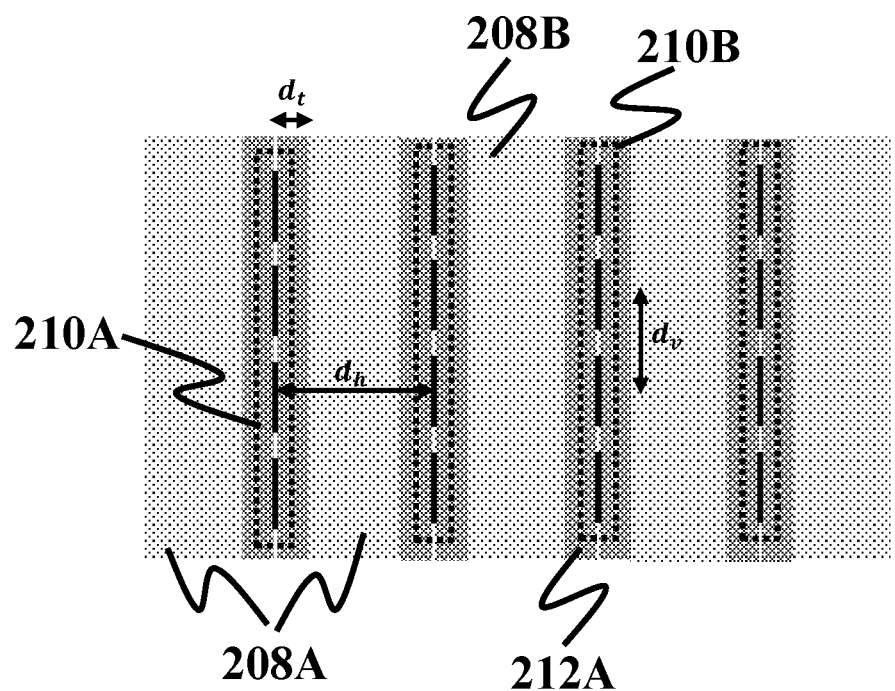
FIG. 2C shows a schematic of a top-view of a radiation detector, consistent with one or more exemplary embodiments of the present disclosure.

FIG. 2C shows a schematic of a top-view of a radiation detector, consistent with one or more exemplary embodiments of the present disclosure. Referring to FIGS. 1B, 2B and 2C, in an exemplary embodiment, step 116 may include positioning plurality of anode strips sets 210. In an exemplary embodiment, respective anode strips in each respective anode strips set of plurality of anode strips sets 210 may be equally spaced apart on a respective anode plane of a plurality of anode planes. In an exemplary embodiment, each respective anode strips set of the plurality of anode strips sets may be disposed between a respective pair of adjacent cathode films of plurality of cathode films 208, that is, an anode strip set 210A of plurality of anode strips sets 210 may be disposed between an adjacent pair of cathode films 208A of plurality of cathode films 208. In an exemplary embodiment, a top edge of each of plurality of anode strips sets 210 may be disposed on detection plane 216. In an exemplary embodiment, a vertical distance $d_v$ of each adjacent pair of anode strips in each anode strips set of plurality of anode strips sets 210 may be equal to $\sqrt{12}\,R_v$ where $R_v$ is a vertical resolution of radiation detector 202. In an exemplary embodiment, the vertical resolution of radiation detector 202 may refer to a precision of detection in a vertical axis on detection plane 216. In an exemplary embodiment, a horizontal distance $d_h$ of each adjacent pair of anode strips in each anode strips set of plurality of anode strips sets 210 may be equal to $\sqrt{12}\,R_h$ where $R_h$ is a horizontal resolution of radiation detector 202. In an exemplary embodiment, the horizontal resolution of radiation detector 202 may refer to a precision of detection in a horizontal axis on detection plane 216. In an exemplary embodiment, each anode strip in each of plurality of anode strips sets 210 may include a respective aluminum strip. In an exemplary embodiment, a thickness of each anode strip in each of plurality of anode strips sets 210 may be smaller than a thickness of each of plurality of cathode films 208.

Figure 2D:
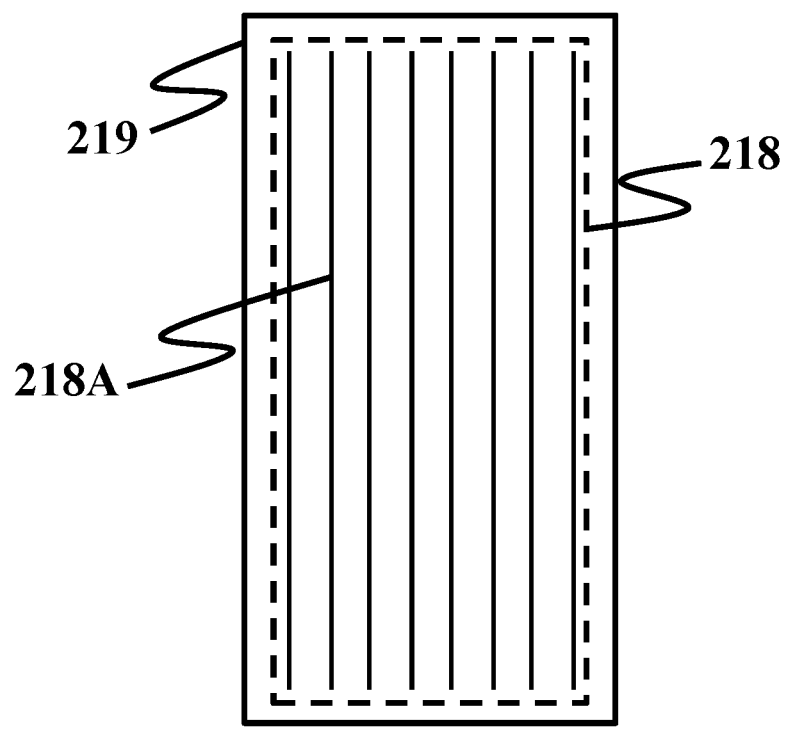
FIG. 2D shows a schematic of a ribbon cable, consistent with one or more exemplary embodiments of the present disclosure.

FIG. 2D shows a schematic of a ribbon cable, consistent with one or more exemplary embodiments of the present disclosure. Referring to FIGS. 2B and 2D, in an exemplary embodiment, plurality of anode strips sets 210 may be implemented utilizing a plurality of ribbon cables 215. In an exemplary embodiment, each of plurality of anode strips sets 210 may be implemented utilizing a respective ribbon cable of plurality of ribbon cables 215. In an exemplary embodiment, plurality of ribbon cables 215 may include a ribbon cable 217. In an exemplary embodiment, each of plurality of anode strips sets 210 may be implemented utilizing ribbon cable 217. A ribbon cable may be referred to as a cable with a number of conductive wires running parallel to each other on a flat substrate. Ribbon cables may be utilized for transferring electric signals between two electrical devices. An exemplary ribbon cable may include a set of conductive wires and a substrate. In an exemplary embodiment, each of plurality of anode strips sets 210 may include a conductive wires set 218 of ribbon cable 217. In an exemplary embodiment, conductive wires set 218 may include a set of conductive wires (for example, a conductive wire 218A). In an exemplary embodiment, conductive wires set 218 may be attached to substrate 219. In an exemplary embodiment, each of plurality of anode strips sets 210 may include a respective conductive wires set of a plurality of conductive wires sets.

In an exemplary embodiment, conductive wires set 218 may include an implementation of each of plurality of anode strips sets 210. In an exemplary embodiment, each of plurality of anode strips sets 210 may include a number of conductive strips. In an exemplary embodiment, fabricating plurality of anode strips sets 210 may necessitate fabricating conductive strips with thicknesses in range of micro/nanometers. In an exemplary embodiment, fabricating conductive strips with thicknesses in range of micro/nanometers may be challenging and costly. In contrast, in an exemplary embodiment, ribbon cable 217 may provide conductive strips, that is, conductive wires set 218, with low complexity and cost. As a result, in an exemplary embodiment, conductive strips in each of plurality of anode strips sets 210 may be implemented utilizing conductive wires set 218 to reduce cost and complexity.

Referring again to FIGS. 1B, 2B and 2D, in an exemplary embodiment, step 118 may include positioning plurality of insulator films 212. In an exemplary embodiment, each of plurality of insulator films 212 may be disposed between and in contact with a respective cathode film of plurality of cathode films 208 and a respective anode strips set of plurality of anode strips sets 210, that is, an insulator film 212A of plurality of insulator films 212 may be disposed between and may be in contact with a cathode film 208B of plurality of cathode films 208 and an anode strips set 210B of plurality of anode strips sets 210. In an exemplary embodiment, a top edge of each of plurality of insulator films 212 may be disposed on detection plane 216. In an exemplary embodiment, each of plurality of insulator films 212 may include a respective substrate of a respective ribbon cable of plurality of ribbon cables 215. In an exemplary embodiment, each of plurality of insulator films 212 may include a substrate 219 of ribbon cable 217. In an exemplary embodiment, since a thickness $d_t$ of each of plurality of insulator films 212 includes a portion of horizontal distance $d_h$, horizontal distance $d_h$ may be larger for larger values of thickness $d_t$. In an exemplary embodiment, a thickness of substrate 219 may be smaller than thickness $d_t$ for a required value of horizontal distance $d_h$. Therefore, in an exemplary embodiment, each of plurality of insulator films 212 may be implemented by attaching a number of substrates together so that a thickness of attached substrates is equal to thickness $d_t$, and consequently, horizontal distance $d_h$ may be equal to the required value. In an exemplary embodiment, a number of substrates may be obtained by dissolving conductive wires sets of a number of ribbon cables in a solvent such as acetone. In an exemplary embodiment, substrates obtained by dissolving conductive wires sets may be disposed in contact to each other and may form an insulator film. In an exemplary embodiment, each of plurality of insulator films 212 may include a respective Mylar film.

In an exemplary embodiment, top edges of plurality of cathode films 208, plurality of anode strips sets 210, and plurality of insulator films 212 may be disposed on detection plane 216. In an exemplary embodiment, disposing top edges of plurality of cathode films 208, plurality of anode strips sets 210, and plurality of insulator films 212 may include cutting edges of plurality of cathode films 208, plurality of anode strips sets 210, and plurality of insulator films 212. Next, in an exemplary embodiment, a surface of cut edges may be polished to make a smooth surface. In an exemplary embodiment, the surface of cut edges may be polished utilizing sandpapers with various grit sizes. An exemplary surface of cut edges may be polished utilizing coarser sandpapers and then utilizing finer sandpapers. An exemplary surface of cut edges may be cleaned by acetone. In an exemplary embodiment, a resistance between each of plurality of anode strips sets 210 and plurality of cathode films 208 may be measured. In an exemplary embodiment, when a measured resistance is smaller than an expected value, polishing may be repeated to prevent connections between corresponding anode strips and cathode films. In an exemplary embodiment, an electric discharge between plurality of anode strips sets 210 and plurality of cathode films 208 may damage top edges of plurality of anode strips sets 210 and plurality of cathode films 208. In an exemplary embodiment, damaged parts of plurality of anode strips sets 210 and plurality of cathode films 208 may be discarded by polishing top edges of plurality of anode strips sets 210 and plurality of cathode films 208.

Referring again to FIGS. 1B, 2A, and 2B, in an exemplary embodiment, step 120 may include generating drift region 214. In an exemplary embodiment, radiation detector 202 may further include a conductive grid 220. In an exemplary embodiment, drift region 214 may be generated by disposing conductive grid 220 in parallel with detection plane 216. In an exemplary embodiment, drift region 214 may include a region between conductive grid 220 and detection plane 216.

Referring again to FIGS. 1A, 1B, and 2B, in an exemplary embodiment, providing radiation detector (step 102) may further include fixing a respective distance between each respective cathode film of plurality of cathode films 208 and each respective anode plane of the plurality of anode planes (step 122). In an exemplary embodiment, radiation detector 202 may further include a pair of plexiglass sheets. In an exemplary embodiment, a respective distance between each respective cathode film of plurality of cathode films 208 and each respective anode plane of the plurality of anode planes may be fixed utilizing the pair of plexiglass sheets. In an exemplary embodiment, the pair of plexiglass sheets may include a left plexiglass sheet 221A and a right plexiglass sheet 221B. In an exemplary embodiment, left plexiglass sheet 221A may be in contact with a leftmost cathode film of plurality of cathode films 208. In an exemplary embodiment, right plexiglass sheet 221B may be in contact with a rightmost cathode film of plurality of cathode films 208. In an exemplary embodiment, distances between plurality of cathode films 208 and the plurality of anode planes may be fixed by tightly screwing the leftmost cathode film to the rightmost cathode film.

Figure 1C:
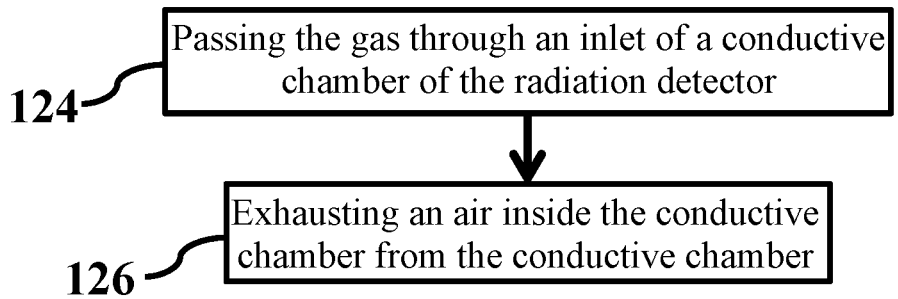
FIG. 1C shows a flowchart of a method for filling a drift region, consistent with one or more exemplary embodiments of the present disclosure.

In further detail regarding step 104, FIG. 1C shows a flowchart of a method for filling a drift region, consistent with one or more exemplary embodiments of the present disclosure. Referring again to FIGS. 1A, 1C, and 2B, in an exemplary embodiment, filling drift region 214 (step 104) may include confining a gas inside drift region 214 by passing the gas through an inlet of a conductive chamber (step 124) and exhausting an air inside the conductive chamber from the conductive chamber (step 126). In an exemplary embodiment, radiation detector 202 may further include a conductive chamber 222. In an exemplary embodiment, conductive chamber 222 may be filled with a gas 224.

For further detail with regard to step 124, in an exemplary embodiment, conductive chamber 222 may include an inlet 226. In an exemplary embodiment, gas 224 may be confined inside conductive chamber 222 when gas 224 passes through inlet 226. In an exemplary embodiment, gas 224 may be confined inside drift region 214 when gas 224 is confined in conductive chamber 222. In an exemplary embodiment, gas 224 may be passed through inlet 226 utilizing a gas source. An exemplary gas source may pass gas 224 through inlet 226 with a steady state pressure. In an exemplary embodiment, filling drift region 214 with gas 224 may take some time depending on the steady state pressure. In an exemplary embodiment, electromagnetic waves in an environment surrounding radiation detector 202 may negatively impact an ionization of gas 224. However, in an exemplary embodiment, confining gas 224 inside conductive chamber 224 may isolate gas 224 from unwanted electromagnetic waves and may enhance a performance of radiation detector 202.

In further detail with respect to step 126, in an exemplary embodiment, conductive chamber 222 may include an outlet 228. An exemplary air inside conductive chamber 222 may be exhausted from conductive chamber 222 through outlet 228. In an exemplary embodiment, radiation detector 202 may require conductive chamber 222 to be filled with gas 224 during a radiation detection process. However, in an exemplary embodiment, conductive chamber 222 may be filled with air at the beginning of a radiation detection process. In an exemplary embodiment, an air inside of conductive chamber 222 may be depleted from conductive chamber 222. In an exemplary embodiment, depletion of the air inside of conductive chamber 222 may be performed by injecting gas 224 inside conductive chamber 222 utilizing the gas source. In an exemplary embodiment, a pressure of gas 224 may be larger than a pressure of air inside conductive chamber 222. As a result, an exemplary air inside conductive chamber 222 may be gradually exhausted through outlet 228 by injecting gas 224 inside conductive chamber 222.

Referring again to FIGS. 1A and 2A, in an exemplary embodiment, step 106 may include exposing conductive grid 220 to an ionizing radiation 230. In an exemplary embodiment, conductive grid 220 may be exposed to ionizing radiation 230 by facing conductive grid 220 toward a source of ionizing radiation 230. Exemplary sources of ionizing radiation 230 may include cosmic rays, X-ray tubes, particle accelerators, and nuclear fissions fragments.

Figure 2E:
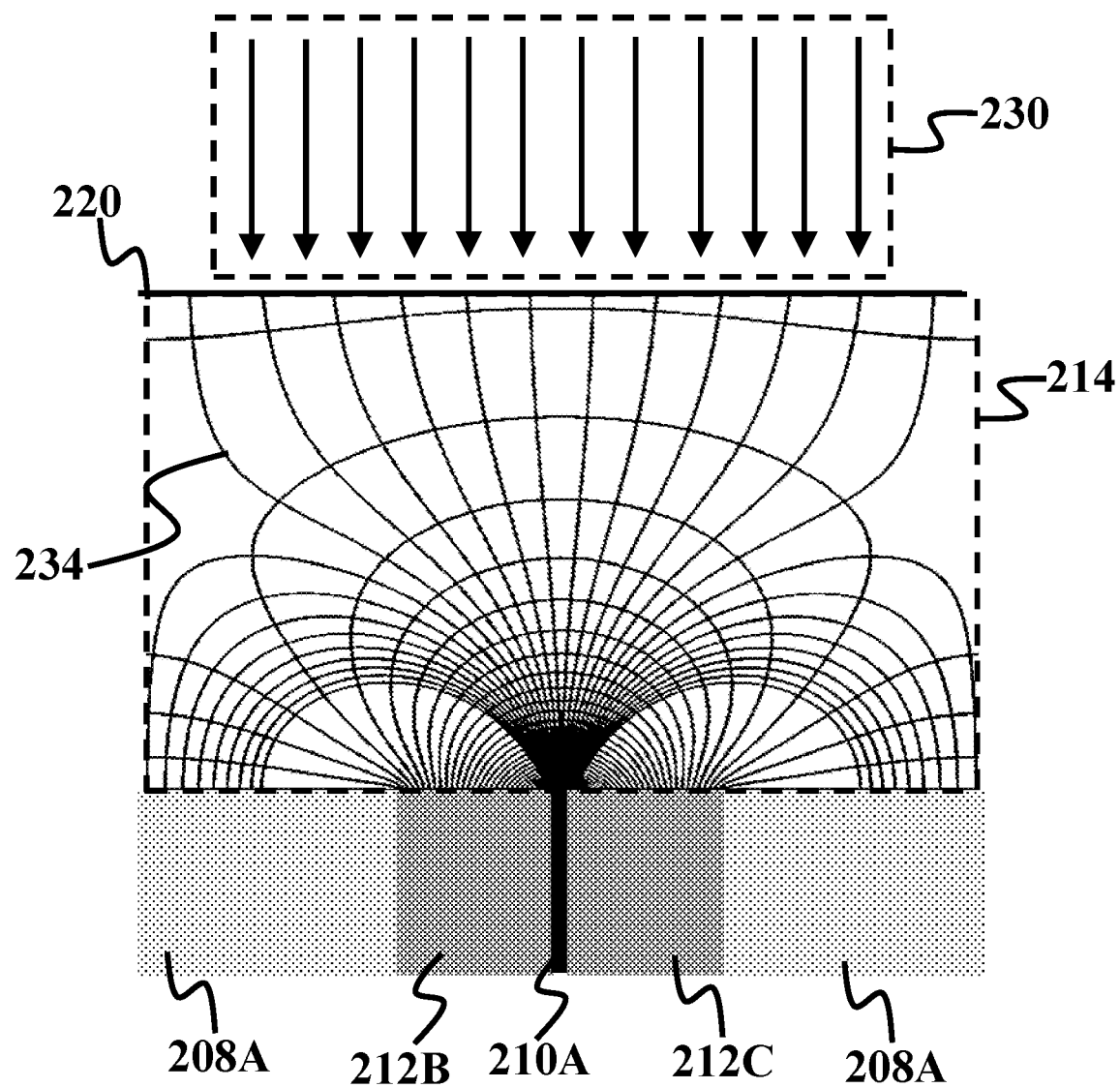
FIG. 2E shows a schematic of an electric field, consistent with one or more exemplary embodiments of the present disclosure.

FIG. 2E shows a schematic of an electric field, consistent with one or more exemplary embodiments of the present disclosure. Referring to FIGS. 1A, 2A, and 2E, system 200 may further include a direct current (DC) high voltage source 232. In an exemplary embodiment, high voltage source 232 may be configured to generate an electric field 234.

In an exemplary embodiments, step 108 may include ionizing gas 224 by generating electric field 234. In an exemplary embodiment, electric field 234 may be generated inside drift region 214. In an exemplary embodiment, electric field 234 may be generated utilizing DC high voltage source 232. In an exemplary embodiment, electric field 234 may be generated responsive to application of a first electric potential on each of plurality of cathode films 208, application of a second electric potential on each anode strip in each of plurality of anode strips sets 210, and application of a third electric potential on conductive grid 220. In an exemplary embodiment, the second electric potential may be larger than the first electric potential. In an exemplary embodiment, the third electric potential may be smaller than the first electric potential. As a result, in an exemplary embodiment, the third electric potential may be smaller than the second electric potential. In an exemplary embodiment, ionizing radiation 230 may include a plurality of charged particles. In an exemplary embodiment, the plurality of charged particles may ionize gas 224, generating a number of emitted electrons and positive ions from gas 224. In an exemplary embodiment, emitted electrons may be accelerated by electric field 234. In an exemplary embodiment, emitted electrons may further ionize gas 224 and generate secondary emitted electrons. In an exemplary embodiment, electric field 234 may cause an avalanche of emitted electrons near plurality of anode strips sets 210. In an exemplary embodiment, an electron multiplication gain of radiation detector 202 may be referred to as a number of emitted electrons generated by a single charged particle of ionizing radiation 230. In an exemplary embodiment, since the third electric potential is smaller than the second electric potential, electric field 234 may force emitted electrons from conductive grid 220 toward plurality of anode strips sets 210. As a result, in an exemplary embodiment, anode strips set 210A may collect emitted electrons in a neighborhood of anode strips set 210A. In an exemplary embodiment, plurality of anode strips sets 210 may include a plurality of pixels of radiation detector 202. In an exemplary embodiment, ionizing radiation 230 may be positioned to a pixel of the plurality of pixels when a level of electric current induced on a respective anode strip in each of plurality of anode strips sets 210 is larger than a threshold.

In an exemplary embodiment, since the second electric potential may be larger than the first electric potential, electric field 234 may force positive ions toward plurality of cathode films 208. As a result, in an exemplary embodiment, adjacent pair of cathode films 208A may collect positive ions generated by electric field 234. In an exemplary embodiment, increasing a potential difference between the second electric potential and the first electric potential, and a potential difference between the third electric potential and the first electric potential may increase an electron multiplication gain of radiation detector 202. However, in an exemplary embodiment, excessive potential differences may result in electric discharges between plurality of cathode films 208 and plurality of anode strips sets 210. As a result, in an exemplary embodiment, values of the first electric potential, the second electric potential, and the third electric potential may be tuned to maximize the electron multiplication gain while no electric discharges occur. In an exemplary embodiment, horizontal distance $d_h$ may impact a probability of discharges between plurality of anode strips sets 210 and plurality of cathode films 208. In an exemplary embodiment, increasing horizontal distance $d_h$ may decrease a probability of discharges. However, in an exemplary embodiment, for a fixed values of the first electric potential and the second electric potential, an electron multiplication gain of radiation detector 202 may decrease as well. In an exemplary embodiment, a distance between detection plane 216 and conductive grid 220 may impact an electron multiplication gain of radiation detector 202. In an exemplary embodiment, increasing the distance between detection plane 216 and conductive grid 220 may increase electron multiplication gain of radiation detector 202. However, in an exemplary embodiment, increasing the distance between detection plane 216 and conductive grid 220 may require larger electric potential differences between the first electric potential, the second electric potential, and the third electric potential.

In an exemplary embodiment, ionizing gas 224 may generate electrons and positive ions. Positive ions that accumulate on an insulator surface of an exemplary radiation detector may impact an electric field of the radiation detector and degrade a performance of the radiation detector. In an exemplary embodiment, radiation detector 202 may prevent accumulation of positive ions on top edges of plurality of insulator films 212 by forming electric field 234. In an exemplary embodiment, lines of electric field 234 may exit plurality of anode strips sets 210 and may be terminated at plurality of cathode films 208. As a result, in an exemplary embodiment, positive ions may not be forced toward plurality of insulator films 212. Therefore, in an exemplary embodiment, positive ions may not accumulate on top edges of plurality of insulator films 212. In an exemplary embodiment, because plurality of anode strips sets 210 may extend inside plurality of insulator films 212, a number of field lines may also exit from inside of plurality of insulator films 212 and may end at plurality of cathode films 208. Consequently, in an exemplary embodiment, electric field 234 may drive positive ions to plurality of cathode films 208 and prevent an accumulation of positive ions on top edges of plurality of insulator films 212.

Figure 1D:
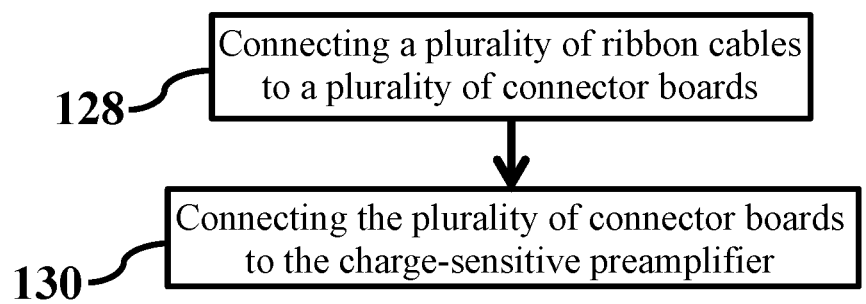
FIG. 1D shows a flowchart of a method for connecting a plurality of ribbon cables to a charge-sensitive preamplifier, consistent with one or more exemplary embodiments of the present disclosure.

In further detail regarding step 110, FIG. 1D shows a flowchart of a method for connecting a plurality of ribbon cables to a charge-sensitive preamplifier, consistent with one or more exemplary embodiments of the present disclosure. Referring to FIGS. 1A, 1D, and 2A, in an exemplary embodiment, step 110 may include extracting a plurality of electric pulses from plurality of anode strips sets 210. In an exemplary embodiment, based on detail of step 108, emitted electrons may be collected by plurality of ribbon cables 215. Exemplary emitted electrons may induce different electric currents in each of plurality of ribbon cables 215. In an exemplary embodiment, amplitudes of electric currents may be smaller than a sensitivity of pulse height analyzer 206. Therefore, in an exemplary embodiment, an amplification of electric currents may be necessary. In an exemplary embodiment, charge-sensitive preamplifier 204 may be utilized to amplify electric currents and generate respective electric pulses. In an exemplary embodiment, charge-sensitive preamplifier 204 may be referred to as an electronic device that integrates a current signal and generates an electric pulse with an amplitude proportional to an input electric charge. In an exemplary embodiment, charge-sensitive preamplifier 204 may generate the plurality of electric pulses when plurality of ribbon cables 215 are connected to charge-sensitive preamplifier 204. Therefore, in an exemplary embodiment, extracting the plurality of electric pulses may include connecting plurality of ribbon cables 215 to charge-sensitive preamplifier 204. Then, exemplary plurality of electric pulses may be generated by charge-sensitive preamplifier 204. In an exemplary embodiment, the plurality of electric pulses may be extracted from an output of charge-sensitive preamplifier 204. In an exemplary embodiment, extracting the plurality of electric pulses may include connecting the output of charge-sensitive preamplifier 204 to an electrical connector. An exemplary electrical connector may provide pulse height analyzer 206 with the plurality of electric pulses.

In an exemplary embodiment, connecting plurality of ribbon cables 215 to charge-sensitive preamplifier 204 may include connecting plurality of ribbon cables 215 to a plurality of connector boards (step 128) and connecting a plurality of connector boards to charge-sensitive preamplifier 204 (step 130). In an exemplary embodiment, plurality of ribbon cables 215 may be connected to charge-sensitive preamplifier 204 utilizing a plurality of connector boards 236. In an exemplary embodiment, each of plurality of ribbon cables 215 may be connected to charge-sensitive preamplifier 204 utilizing a respective connector board of plurality of connector boards 236. In an exemplary embodiment, the plurality of electric pulses may be extracted utilizing charge-sensitive preamplifier 204.

Figure 2F:
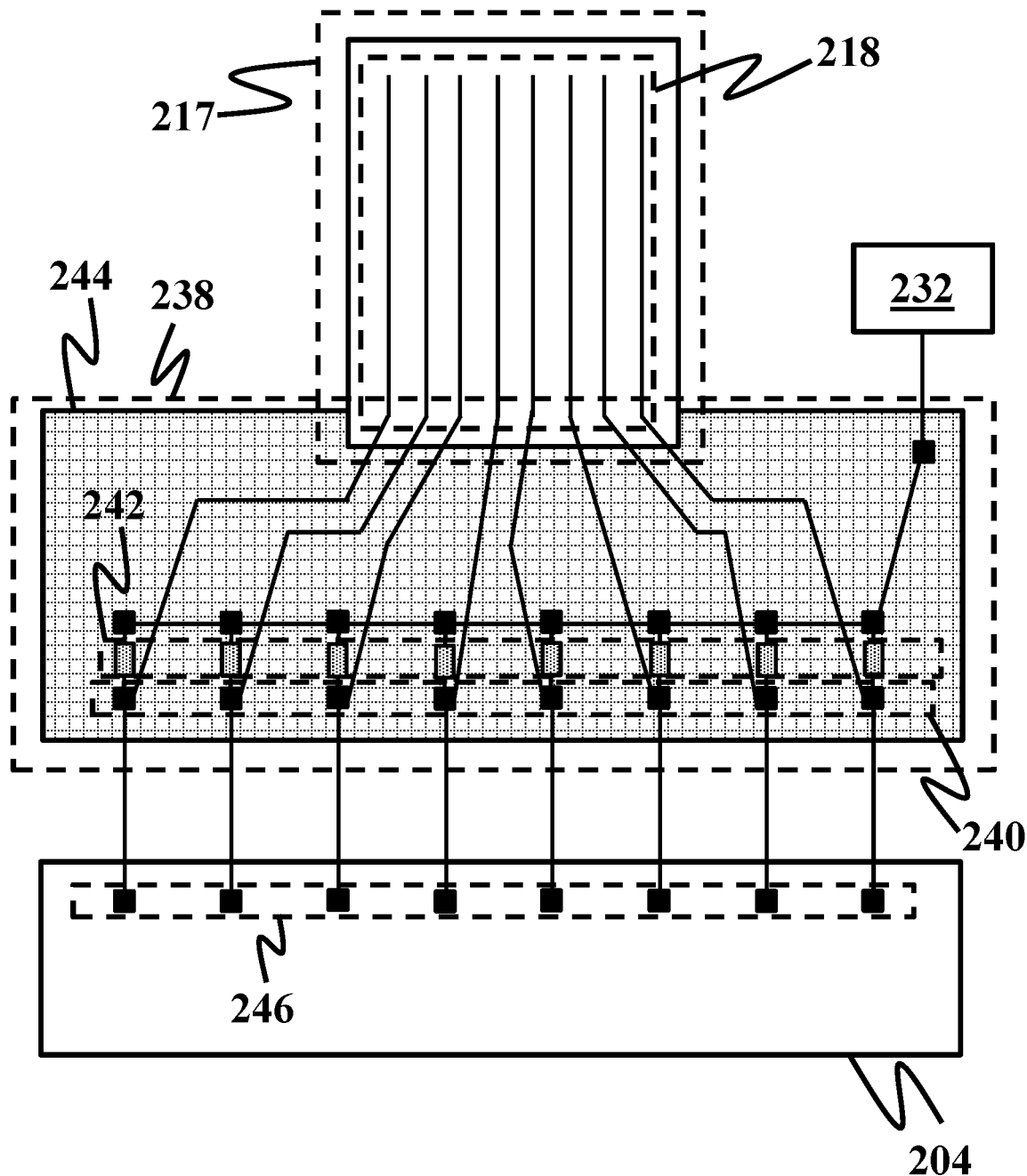
FIG. 2F shows a schematic of a connector board, consistent with one or more exemplary embodiments of the present disclosure.

FIG. 2F shows a schematic of a connector board, consistent with one or more exemplary embodiments of the present disclosure. In an exemplary embodiment, a connector board 238 of plurality of connector boards 236 may include a plurality of conductive pads 240, a plurality of resistors 242, and a plexiglass sheet 244. In an exemplary embodiment, connector board 238 may include an implementation of each of plurality of connector boards 236.

Referring to FIGS. 1D and 2F, step 128 may include connecting plurality of ribbon cables 215 to plurality of connector boards 236. In an exemplary embodiment, each of plurality of ribbon cables 215 may be connected to a respective connector board of plurality of connector boards 236. In an exemplary embodiment, ribbon cable 217 may be connected to connector board 238. In an exemplary embodiment, each of plurality of conductive pads 240 may be configured to be in contact with a respective conductive wire in a respective conductive wires set of the plurality of conductive wires sets. In an exemplary embodiment, each of plurality of conductive pads 240 may be configured to be in contact with a respective conductive wire in conductive wires set 218. In an exemplary embodiment, plurality of conductive pads 240 may be printed on connector board 238. In an exemplary embodiment, conductive wires in conductive wires set 218 may include a thickness in range of micro/nanometers. As a result, in an exemplary embodiment, a soldering of conductive wires set 218 with plurality of conductive pads 240 may not be practical. In an exemplary embodiment, a contact of conductive wires set 218 with plurality of conductive pads 240 may be fixed without soldering. In an exemplary embodiment, a contact of conductive wires set 218 with plurality of conductive pads 240 may be fixed utilizing plexiglass sheet 244. In an exemplary embodiment, plexiglass sheet 244 may be screwed tightly on connector board 238. As a result, conductive wires set 218 may be fixed on plurality of conductive pads 240. In an exemplary embodiment, DC high voltage source 232 may apply the second electric potential to each conductive wire in conductive wires set 218 through a respective resistor of plurality of resistors 242. In an exemplary embodiment, plurality of resistors 242 may isolate induced signals of different conductive wires from each other and also may limit a current of DC high voltage source 232.

In further detail with respect to step 130, connecting the plurality of connector boards to charge-sensitive preamplifier 204 may include connecting plurality of conductive pads 240 to charge-sensitive preamplifier 204. In an exemplary embodiment, charge-sensitive preamplifier 204 may include a plurality of inputs 246. In an exemplary embodiment, each of plurality of conductive pads 240 may be connected to a respective input of plurality of inputs 246.

Referring to FIGS. 1A and 2A, in an exemplary embodiment, step 112 may include obtaining a position of ionizing radiation 230 based on the plurality of electric pulses. In an exemplary embodiment, a position of ionizing radiation 230 may be obtained utilizing pulse height analyzer 206. In an exemplary embodiment, pulse height analyzer 206 may include a processor utilized for obtaining a position of ionizing radiation 230. In an exemplary embodiment, a position of ionizing radiation 230 may be obtained by feeding the plurality of electric pulses from charge-sensitive preamplifier 204 to pulse height analyzer 206. In an exemplary embodiment, pulse height analyzer 206 may generate a plurality of digitized electric pulses by digitizing each of the plurality of electric pulses and may determine a digitized height of each of the plurality of digitized electric pulses. In an exemplary embodiment, pulse height analyzer 206 may digitize each of the plurality of electric pulses by utilizing an analog-to digital converter (ADC). In an exemplary embodiment, pulse height analyzer 206 may include a plurality of digitized heights. In an exemplary embodiment, pulse height analyzer 206 may count a number of digitized electric pulses with a specific digitized height. In an exemplary embodiment, pulse height analyzer 206 may obtain a position of ionizing radiation 230 when a number of digitized electric pulses with a height larger than a height threshold reaches a maximum count. An exemplary height threshold may be obtained by obtaining digitized heights of digitized electric pulses when radiation detector 202 is not exposed to ionizing radiation 230. In an exemplary embodiment, a number of digitized electric pulses may be obtained from a specific conductive wire. In an exemplary embodiment, pulse height analyzer 206 may generate a pixel count by counting a number of digitized electric pulses when heights of digital pulses are larger than the height threshold in a definite time window. In an exemplary embodiment, when the pixel count is maximum, pulse height analyzer 206 may determine a position of the specific conductive wire as a position of ionizing radiation 230. In an exemplary embodiment, for 2D positioning, an array of positions may be obtained in a single time window.

Figure 3:
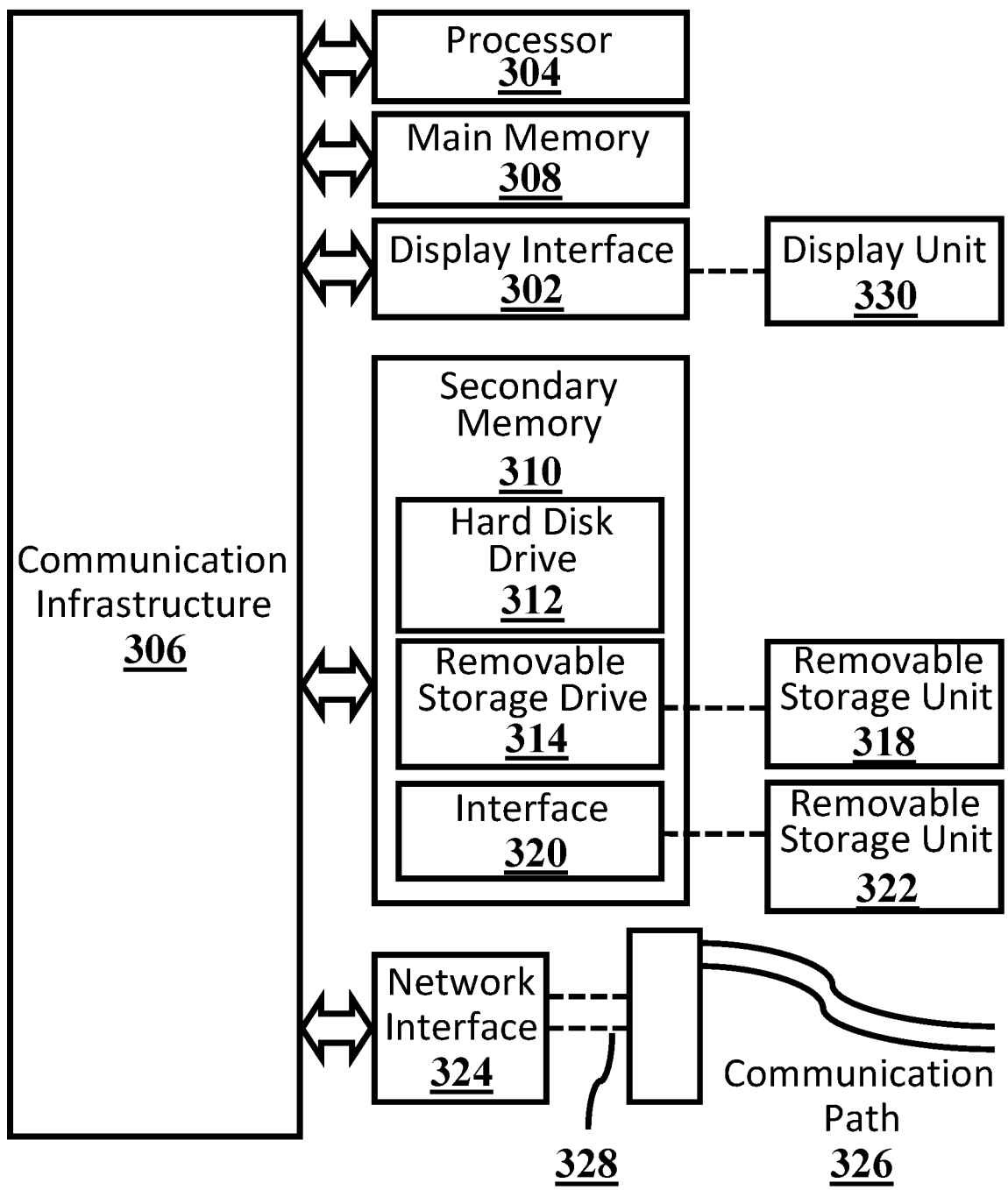
FIG. 3 shows a high-level functional block diagram of a computer system, consistent with one or more exemplary embodiments of the present disclosure.

FIG. 3 shows an example computer system 300 in which an embodiment of the present invention, or portions thereof, may be implemented as computer-readable code, consistent with exemplary embodiments of the present disclosure. For example, step 112 of method 100 may be implemented in computer system 300 using hardware, software, firmware, tangible computer readable media having instructions stored thereon, or a combination thereof and may be implemented in one or more computer systems or other processing systems. Hardware, software, or any combination of such may embody any of the modules and components in FIGS. 1A-2F.

If programmable logic is used, such logic may execute on a commercially available processing platform or a special purpose device. One ordinary skill in the art may appreciate that an embodiment of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An embodiment of the invention is described in terms of this example computer system 300. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 304 may be a special purpose (e.g., a graphical processing unit) or a general-purpose processor device. As will be appreciated by persons skilled in the relevant art, processor device 304 may also be a single processor in a multi-core/multiprocessor system, such system operating alone, or in a cluster of computing devices operating in a cluster or server farm. Processor device 304 may be connected to a communication infrastructure 306, for example, a bus, message queue, network, or multi-core message-passing scheme.

In an exemplary embodiment, computer system 300 may include a display interface 302, for example a video connector, to transfer data to a display unit 330, for example, a monitor. Computer system 300 may also include a main memory 308, for example, random access memory (RAM), and may also include a secondary memory 310. Secondary memory 310 may include, for example, a hard disk drive 312, and a removable storage drive 314. Removable storage drive 314 may include a floppy disk drive, a magnetic tape drive, an optical disk drive, a flash memory, or the like. Removable storage drive 314 may read from and/or write to a removable storage unit 318 in a well-known manner. Removable storage unit 318 may include a floppy disk, a magnetic tape, an optical disk, etc., which may be read by and written to by removable storage drive 314. As will be appreciated by persons skilled in the relevant art, removable storage unit 318 may include a computer usable storage medium having stored therein computer software and/or data.

In alternative implementations, secondary memory 310 may include other similar means for allowing computer programs or other instructions to be loaded into computer system 300. Such means may include, for example, a removable storage unit 322 and an interface 320. Examples of such means may include a program cartridge and cartridge interface (such as that found in video game devices), a removable memory chip (such as an EPROM, or PROM) and associated socket, and other removable storage units 322 and interfaces 320 which allow software and data to be transferred from removable storage unit 322 to computer system 300.

Computer system 300 may also include a communications interface 324. Communications interface 324 allows software and data to be transferred between computer system 300 and external devices. Communications interface 324 may include a modem, a network interface (such as an Ethernet card), a communications port, a PCMCIA slot and card, or the like. Software and data transferred via communications interface 324 may be in the form of signals, which may be electronic, electromagnetic, optical, or other signals capable of being received by communications interface 324. These signals may be provided to communications interface 324 via a communications path 326. Communications path 326 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 318, removable storage unit 322, and a hard disk installed in hard disk drive 312. Computer program medium and computer usable medium may also refer to memories, such as main memory 308 and secondary memory 310, which may be memory semiconductors (e.g. DRAMs, etc.).

Computer programs (also called computer control logic) are stored in main memory 308 and/or secondary memory 310. Computer programs may also be received via communications interface 324. Such computer programs, when executed, enable computer system 300 to implement different embodiments of the present disclosure as discussed herein. In particular, the computer programs, when executed, enable processor device 304 to implement the processes of the present disclosure, such as the operations in In an exemplary embodiment, a method 100 illustrated by flowchart 100 of FIG. 1A discussed above. Accordingly, such computer programs represent controllers of computer system 300. Where an exemplary embodiment of In an exemplary embodiment, a method 100 is implemented using software, the software may be stored in a computer program product and loaded into computer system 300 using removable storage drive 314, interface 320, and hard disk drive 312, or communications interface 324.

Embodiments of the present disclosure also may be directed to computer program products including software stored on any computer useable medium. Such software, when executed in one or more data processing device, causes a data processing device to operate as described herein. An embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Example

In this example, a performance of a method (similar to method 100) for positioning an ionizing radiation is demonstrated. Different steps of the method are implemented utilizing radiation detection system (similar to system 200). A radiation detector (similar to radiation detector 202) includes 5 ribbon cables (similar to plurality of ribbon cables 215). Each of ribbon cables include a conductive wires set (similar to conductive wires set 218) including 24 conductive wires. A horizontal distance (similar to horizontal distance $d_h$) is set to about 547 µm and a vertical distance (similar to vertical distance $d_v$) is set to about 1 mm. A distance between a detection plane (similar to detection plane 216) and a conductive grid (similar to conductive grid 220) is set to about 1 cm. The conductive grid is exposed to a source of an ionizing radiation (similar to ionizing radiation 230). The source of the ionizing radiation includes alpha particles of radium-226. The system also includes a plurality of resistors (similar to plurality of resistors 242). Each of the plurality of resistors includes a resistance about 200 MΩ. An electric potential difference between the first electric potential and the second electric potential is set to about 350 V and an electric potential difference between the first electric potential and the third electric potential is set to about −500 V.

Figure 4:
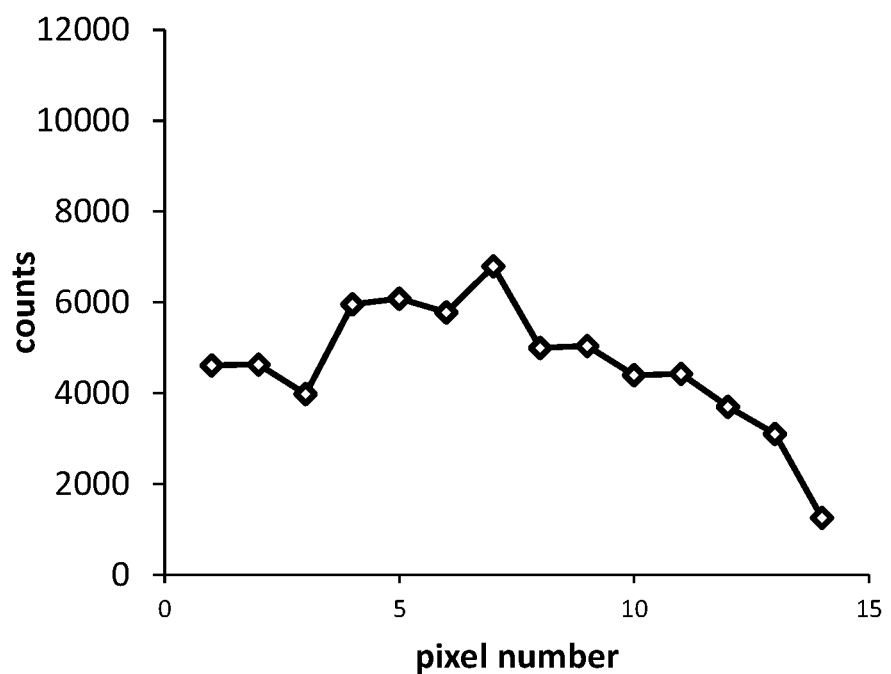
FIG. 4 shows a count of electric pulses in a ribbon cable, consistent with one or more exemplary embodiments of the present disclosure.

FIG. 4 shows a count of electric pulses in a ribbon cable, consistent with one or more exemplary embodiments of the present disclosure. A number of electric pulses obtained from each conductive wire is counted utilizing a pulse height analyzer (similar to pulse height analyzer 206). The source of radiation is faced to a specific conductive wire, that is, a specific pixel of the radiation detector. As a result, more electric pulses are counted from the specific pixel. However, since the source of radiation is not a point source, some electric pulses are counted from adjacent pixels. To determine a position of the ionizing radiation, a pixel with maximum counts is selected.

Electron multiplication gain of the radiation detector is shown in Table 1. Increasing a potential difference between anode strips and cathode films, that is, a difference between the first electric potential and the second electric potential, increases electron multiplication gain of the radiation detector. However, with the horizontal distance of about 547 µm, when the electric potential difference is greater than 350 V, electric discharges may occur between anode strips and cathode films. Increasing electron multiplication gain may result in higher power electric pulses. Higher powers of electric pulses may enhance a precision of radiation detection. Therefore, a higher electron multiplication gain may provide a more precise radiation detection. A required electron multiplication gain may be needed for a required precision of radiation detection. According to Table 1, required electron multiplication gain may be obtained by applying a corresponding electric potential difference.

TABLE 1

| Electron multiplication gain of the radiation detector | | | | |
|---|---|---|---|---|
| Electric potential difference (V) | 200 | 300 | 325 | 350 |
| Electron multiplication gain | 3 | 49 | 164 | 239 |

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A system for detecting a position of an ionizing radiation, comprising:
   a radiation detector comprising:
      a plurality of cathode films, a top edge of each of the plurality of cathode films disposed on a detection plane;
      a plurality of anode strips sets, wherein:
         respective anode strips in each respective anode strips set of the plurality of anode strips sets are equally spaced apart on a respective anode plane of a plurality of anode planes;
         each respective anode strips set of the plurality of anode strips sets is disposed between a respective pair of adjacent cathode films of the plurality of cathode films; and
         a top edge of each of the plurality of anode strips sets is disposed on the detection plane;
      a plurality of insulator films, each of the plurality of insulator films disposed between a respective cathode film of the plurality of cathode films and a respective anode strips set of the plurality of anode strips sets, each of the plurality of insulator films in contact with a respective cathode film of the plurality of cathode films and a respective anode strips set of the plurality of anode strips sets, a top edge of each of the plurality of insulator films disposed on the detection plane;
      a conductive grid disposed in parallel with the detection plane and exposed to the ionizing radiation; and
      a drift region between the conductive grid and the detection plane, the drift region filled with a gas,
      wherein the radiation detector is configured to ionize the gas by generating an electric field inside the drift region responsive to:
         application of a first electric potential on each of the plurality of cathode films;
         application of a second electric potential larger than the first electric potential on each anode strip of the plurality of anode strips sets; and
         application of a third electric potential smaller than the first electric potential on the conductive grid;
   a charge-sensitive preamplifier configured to extract a plurality of electric pulses from the plurality of anode strips sets; and
   a pulse height analyzer configured to obtain a position of the ionizing radiation based on the plurality of electric pulses.

2. The system of claim 1, wherein the radiation detector further comprises a pair of plexiglass sheets configured to fix a respective distance between each respective cathode film of the plurality of cathode films and each respective anode plane of the plurality of anode planes.

3. The system of claim 1, further comprising a direct current (DC) high voltage source configured to:
   apply the first electric potential on each of the plurality of cathode films;

apply the second electric potential on each anode strip of the plurality of anode strips sets; and apply the third electric potential on the conductive grid.

4. The system of claim 3, wherein:

each of the plurality of insulator films comprises a respective substrate of a respective ribbon cable of a plurality of ribbon cables; and each of the plurality of anode strips sets comprises a respective conductive wires set of a plurality of conductive wires sets, each of the plurality of conductive wires sets attached to a respective substrate of a respective ribbon cable of the plurality of ribbon cables.

5. The system of claim 4, further comprising a plurality of connector boards configured to connect the plurality of ribbon cables to the charge-sensitive preamplifier, each of the plurality of connector boards comprising:

a plurality of conductive pads, each of the plurality of conductive pads configured to be in contact with a respective conductive wire in a respective conductive wires set of the plurality of conductive wires sets, the plurality of conductive pads connected to the charge-sensitive preamplifier;

a plurality of resistors, each of the plurality of resistors configured to connect an output of the DC high voltage source to a respective conducting wire in a respective conductive wires set of the plurality of conductive wires sets; and a plexiglass sheet configured to fix a contact of each respective conductive wire in a respective conductive wires set of the plurality of conductive wires sets to a respective conductive pad of the plurality of conductive pads.

6. The system of claim 1, wherein:

a vertical distance of each adjacent pair of anode strips in each anode strips set of the plurality of anode strips sets is $\sqrt{12}\, R_v$ where $R_v$ is a vertical resolution of the radiation detector; and a horizontal distance of each adjacent pair of anode strips sets of the plurality of anode strips sets is $\sqrt{12}\, R_h$ where $R_h$ is a horizontal resolution of the radiation detector.

7. The system of claim 1, wherein the radiation detector further comprises a conductive chamber configured to confine the gas inside the drift region, the conductive chamber comprising:

an inlet configured to pass the gas through the conductive chamber; and an outlet configured to exhaust an air inside the conductive chamber from the conductive chamber.

8. The system of claim 1, wherein the gas comprises a mixture of 70% argon and 30% carbon dioxide.

9. The system of claim 1, wherein:

each of the plurality of cathode films comprises a respective copper film;

each anode strip of the plurality of anode strips sets comprises a respective aluminum strip; and each of the plurality of insulator films comprises a respective Mylar film.

10. A method for detecting a position of an ionizing radiation, comprising:

providing a radiation detector, comprising:

disposing a top edge of each of a plurality of cathode films of the radiation detector on a detection plane;

positioning a plurality of anode strips sets of the radiation detector by:

equally spacing respective anode strips in each respective anode strips set of the plurality of anode strips sets on a respective anode plane of a plurality of anode planes;

disposing each respective anode strips set of the plurality of anode strips sets between a respective pair of adjacent cathode films of the plurality of cathode films; and disposing a top edge of each of the plurality of anode strips sets on the detection plane;

positioning a plurality of insulator films of the radiation pattern by:

disposing each of the plurality of insulator films between a respective cathode film of the plurality of cathode films and a respective anode strips set of the plurality of anode strips sets, each of the plurality of insulator films in contact with a respective cathode film of the plurality of cathode films and a respective anode strips set of the plurality of anode strips sets; and disposing a top edge of each of the plurality of insulator films on the detection plane; and generating a drift region between a conductive grid of the radiation detector and the detection plane by disposing the conductive grid in parallel with the detection plane;

filling the drift region with a gas;

exposing the conductive grid to the ionizing radiation;

ionizing the gas by generating an electric field inside the drift region responsive to:

application of a first electric potential on each of the plurality of cathode films;

application of a second electric potential larger than the first electric potential on each anode strip of the plurality of anode strips sets; and application of a third electric potential smaller than the first electric potential on the conductive grid;

extracting a plurality of electric pulses from the plurality of anode strips sets utilizing a charge-sensitive preamplifier; and obtaining a position of the ionizing radiation based on the plurality of electric pulses utilizing a pulse height analyzer.

11. The method of claim 10, wherein providing the radiation detector further comprises fixing, utilizing a pair of plexiglass sheets, a respective distance between each respective cathode film of the plurality of cathode films and each respective anode plane of the plurality of anode planes.

12. The method of claim 10, wherein applying each of the first electric potential, the second electric potential, and the third electric potential comprises applying each of the each of the first electric potential, the second electric potential, and the third electric potential utilizing a direct current (DC) high voltage source.

13. The method of claim 12, wherein:

disposing each respective anode strips set of the plurality of anode strips sets comprises disposing a respective conductive wires set of a plurality of conductive wires sets, each of the plurality of conductive wires sets attached to a respective substrate of a respective ribbon cable of a plurality of ribbon cables; and disposing each of the plurality of insulator films comprises disposing a respective substrate of a respective ribbon cable of the plurality of ribbon cables.

14. The method of claim 13, wherein extracting the plurality of electric pulses comprises connecting the plurality of ribbon cables to the charge-sensitive preamplifier by:
  connecting the plurality of ribbon cables to a plurality of connector boards, comprising:
    contacting each respective conductive pad of a plurality of conductive pads with a respective conductive wire in a respective conductive wires set of the plurality of conductive wires sets, the plurality of conductive pads printed on each respective connector board of the plurality of connector boards; and
    fixing, utilizing a plexiglass sheet, a contact of each respective conductive wire in a respective conductive wires set of the plurality of conductive wires sets to a respective conductive pad of the plurality of conductive pads; and
  connecting the plurality of conductive pads to the charge-sensitive preamplifier.

15. The method of claim 14, wherein applying the second electric potential comprises connecting an output of the DC high voltage source to a respective conducting wire in a respective conductive wires set of the plurality of conductive wires sets through a respective resistor of a plurality of resistors associated with each respective connector board of the plurality of connector boards.

16. The method of claim 10, wherein disposing each respective anode strips set of the plurality of anode strips sets comprises:
  disposing each adjacent pair of anode strips in each anode strips set of the plurality of anode strips sets with a vertical distance equal to $\sqrt{12}\, R_v$, where $R_v$ is a vertical resolution of the radiation detector; and
  disposing each adjacent pair of anode strips sets of the plurality of anode strips sets with a horizontal distance equal to $\sqrt{12}\, R_h$, where $R_h$ is a horizontal resolution of the radiation detector.

17. The method of claim 10, wherein filling the drift region with the gas comprises confining the gas inside the drift region by:
  passing the gas through an inlet of a conductive chamber, and
  exhausting an air inside the conductive chamber from the conductive chamber through an outlet of the conductive chamber.

18. The method of claim 17, wherein filling the drift region with the gas comprises filling the drift region with a mixture of 70% argon and 30% carbon dioxide.

19. The method of claim 10, wherein:
  disposing the top edge of each of the plurality of cathode films comprises disposing a top edge of a plurality of copper films;
  positioning the plurality of anode strips sets comprises positioning a plurality of aluminum strip sets; and
  positioning the plurality of insulator films comprises positioning a plurality of Mylar films.

20. A radiation detector comprising:
  a plurality of cathode films, a top edge of each of the plurality of cathode films disposed on a detection plane;
  a plurality of anode strips sets, wherein:
    respective anode strips in each respective anode strips set of the plurality of anode strips sets are equally spaced apart on a respective anode plane of a plurality of anode planes;
    each respective anode strips set of the plurality of anode strips sets is disposed between a respective pair of adjacent cathode films of the plurality of cathode films; and
    a top edge of each of the plurality of anode strips sets is disposed on the detection plane;
  a plurality of insulator films, each of the plurality of insulator films disposed between a respective cathode film of the plurality of cathode films and a respective anode strips set of the plurality of anode strips sets, each of the plurality of insulator films in contact with a respective cathode film of the plurality of cathode films and a respective anode strips set of the plurality of anode strips sets a top edge of each of the plurality of insulator films disposed on the detection plane;
  a conductive grid disposed in parallel with the detection plane and exposed to the ionizing radiation; and
  a drift region between the conductive grid and the detection plane, the drift region filled with a gas,
  wherein the radiation detector is configured to ionize the gas by generating an electric field inside the drift region responsive to:
    application of a first electric potential on each of the plurality of cathode films;
    application of a second electric potential larger than the first electric potential on each anode strip of the plurality of anode strips sets; and
    application of a third electric potential smaller than the first electric potential on the conductive grid.

* * * * *